United States Patent [19]

Kihara

[11] 3,939,302

[45] Feb. 17, 1976

[54] METHOD AND APPARATUS FOR RECORDING AND/OR REPRODUCING A VIDEO SIGNAL ON A PHOTOGRAPHIC RECORD DISC

[75] Inventor: Nobutoshi Kihara, Tokyo, Japan

[73] Assignee: Sony Corporation, Tokyo, Japan

[22] Filed: Mar. 14, 1974

[21] Appl. No.: 451,298

[30] Foreign Application Priority Data

Mar. 16, 1973 Japan.................. 48-30741

[52] U.S. Cl..... 178/6.6 R; 179/100.3 V; 178/6.7 A; 178/6.6 DD
[51] Int. Cl.².................................. G11B 7/02
[58] Field of Search........ 178/6.7 A, 6.6 R, 6.6 DD; 179/100.3 V, 100.3 B; 358/13

[56] References Cited

UNITED STATES PATENTS

| 2,617,891 | 11/1952 | Karolus | 179/100.3 B |
| 2,972,660 | 2/1961 | Toulon | 178/6.7 R |
| 3,361,873 | 1/1968 | Johnson | 179/100.3 V |
| 3,371,156 | 2/1968 | Frohbach | 179/100.3 V |
| 3,446,914 | 5/1969 | Hodge | 360/19 |
| 3,463,876 | 8/1969 | Law | 360/9 |
| 3,701,846 | 10/1972 | Zenzefilis | 178/6.7 A |

Primary Examiner—Bernard Konick
Assistant Examiner—Alan Faber
Attorney, Agent, or Firm—Lewis H. Eslinger; Alvin Sinderbrand

[57] ABSTRACT

Composite television signals are recorded in a spiral track or in a series of concentric circular tracks on a record disc. Line sequential signals are optically recorded in the radial direction on a record disc with one horizontal line interval of the composite television signals corresponding to the width of the record track, and with the successive line signals being arranged in the circumferential direction of the track. Pulse-time modulated video and audio signals are recorded as a series of depressions all having the same width and the same depth, and with the varying length between the adjacent depressions corresponding to the information signal. A video signal reproducing head is provided adjacent to the optical record disc for optically reproducing video signals from the tracks on the disc which is, during reproduction of the signals, rotated at an extremely low speed so as to facilitate the reliable tracking of the signal reproducing head in respect to the recorded tracks.

24 Claims, 25 Drawing Figures

METHOD AND APPARATUS FOR RECORDING AND/OR REPRODUCING A VIDEO SIGNAL ON A PHOTOGRAPHIC RECORD DISC

BACKGROUND OF THE INVENTION

1. Field of the Invention

This invention relates generally to a method and apparatus for recording and reproducing visual images or video signals, and more praticularly is directed to a method and apparatus for recording and reproducing such signals on a record medium which is in the form of a circular disc.

2. Description of the Prior Art

In the prior art, the most popular method of recording a video signal, such as a television signal or the like, is to record the same magnetically on a magnetic tape.

However, it is rather troublesome to reproduce the signal from a portion of the magnetic tape that is midway between its ends, and handling of the tape also creates problems. Further, the efficiency with which tapes can be reproduced from a master tape is low, and recording and reproducing apparatus for the magnetic tape is complex and expensive.

In order to avoid the above disadvantages, various methods have been proposed which use a recording disc as the recording medium on which the video signal is recorded in a spiral track. In one of these prior art methods, a recording disc with a highly reflective metallic layer is used, and a video signal, by way of example, is recorded in a spiral recording track. Along the length of this spiral recording track, there is formed a row or series of oblong depressions or pits. The oblong depressions are each the same in depth and width but vary in length and distance between adjacent depressions in response to the level of the video signal. In this case, the signal corresponding to, by way of example, one frame of the television signal is recorded in each circle or turn of the spiral recording track.

When the signal recorded on the above described recording disc is reproduced, the recording disc is rotated at high speed (1500 R.P.M.), the recording track is scanned by a light beam, such as a laser light beam, in the circumferential direction of the recording track, and the reflected laser beam is detected.

However, with the above recording method, the efficiency of utilization of the record disc for information recorded thereon is not very high, and consequently it is difficult to record on a single disc information, such as a wide band video signal, corresponding to a long time period. Further, since the recording disc must be rotated at high speed, uneven rotation of the recording disc is apt to produce jitter. Accordingly, the described prior art method requires the provision of a highly effective servo system for controlling the rotational speed and phase of the disc, and such a servo system is complex and expensive. In addition, controlling the tracking of the light beam on the recorded track is difficult and the mechanism required therefor is complicated.

SUMMARY OF THE INVENTION

Accordingly, an object of this invention is to provide an improved method and apparatus for recording and-/or reproducing a signal, such as a video signal, on a record disc medium, and which avoids the above mentioned disadvantage of the existing methods using such a record medium.

Another object of this invention is to provide a method and apparatus for recording and/or reproducing a video signal on a record disc medium, and wherein the efficiency of utilization of the record disc medium is increased with less resultant interference between the signals recorded and reproduced in adjacent spiral or circular tracks, with the result that the recording and/or reproducing time of the signal on a record disc is prolonged.

Still another object of this invention is to provide a method and apparatus for recording and/or reproducing a video signal on a record disc medium wherein the rotational speed of the disc is greatly decreased, and accordingly the video signal recorded thereon can be reproduced without requiring a complicated tracking arrangement to align the scanning paths of the signal reproducing head relative to the recorded spiral or circular tracks.

A further object of this invention is to provide a method and apparatus for optically recording and/or reproducing a video signal on a reflective metallic disc, and wherein a pulse-phase modulated signal is recorded as a series of depressions all having the same width and depth with the depressions for one horizontal frequency period being arranged in the radial direction of the disc and the varying length or distance therebetween being sensed by an optical detector during reproducing of the recorded signal.

According to an aspect of this invention, upon recording a signal, such as a video signal, the successive turns of a spiral track or a series of concentric circular record tracks are formed on a record disc with a reflective metallic layer thereon in such a manner that the signal corresponding to one horizontal frequency period (that is, the time of one horizontal line) of, for example, a composite television signal, is recorded on the record track as a row of pits or depressions extending radially, that is, across the width of the track, after the signal is pulse-phase-modulated. The signals for successive horizontal line periods, each of which is formed as a radial row of pits or depressions, are sequentially recorded in the circumferential direction (the longitudinal direction of the record track) to form a vertical period signal.

Upon reproducing of the recorded signal, a light beam, such as a laser light beam which has relatively low scattering, is directed against the record track through apertures of a rotating optical shutter which are spread apart by a distance equal to the width of the record track, to carry out the sequential scanning of the rows of pits or depressions and to read out the recorded signal.

The above, and other objects, features and advantages of this invention, will be apparent in the following detailed description of illustrative embodiments which is to be read in connection with the accompanying drawings.

DESCRIPTION OF THE PREFERRED EMBODIMENTS

Figure 1:
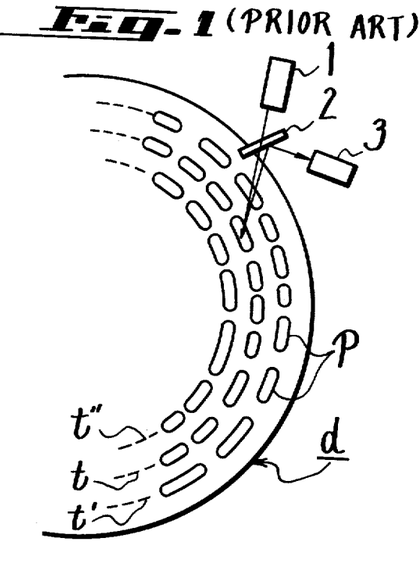
FIG. 1 is a schematic plan view of an optical recording disc having a spiral record track and showing a signal reproducing senser associated therewith in accordance with the prior art.

Before describing the present invention, a recording and/or reproducing system according to the prior art and which operates optically will be described with reference to FIG. 1.

Video and audio information signals are recorded on the surface of a disc $d$ in spiral tracks $t, t'$ and $t''$. Thereafter, the disc $d$ is covered with a reflective metallic layer (not shown). In this case, each of the spiral tracks is formed of successive oblong depressions P which are of the same width and depth. However, the lengths of the depressions P are varied within the range of 0.6 to 0.4μm, in accordance with the video and audio information signals being recorded. In practice, the depressions P are 0.1 μm in depth, 0.7 μm in width and the radial distance between the centers of adjacent tracks is selected to be approximately 2μm. The information signal is recorded on the disc $d$ by any ordinary pressing method such as is used in the audio signal recording. The pits or depressions P corresponding to a horizontal line signal are arranged in the circumferential direction, that is, in the direction along each track, with the successive horizontal line signals being arranged in sequence along the track so that, for example, each track contains the signals for one field.

During reproduction, the disc $d$ is rotated at a speed in accordance with the vertical sweep frequency of the television system, for example, at the speed of 1800 r.p.m. in the case where a television signal of 60Hz which may reproduce 30 pictures or frames per second is being recorded and then reproduced. A laser light beam emitted from a laser source 1 of 1mW, HeNe is projected onto the track of depressions P through a beam-splitting prism 2 and a suitable lens assembly (not shown) and the reflected beam is modulated in accordance with the length and position of the depressions P, and received by a photo-detector 3 after passing through the prism 2 and other suitable optical elements.

However, the above described prior art system is disadvantageous, for example, by reason of the low density of recording that is possible on the disc.

Figure 2:
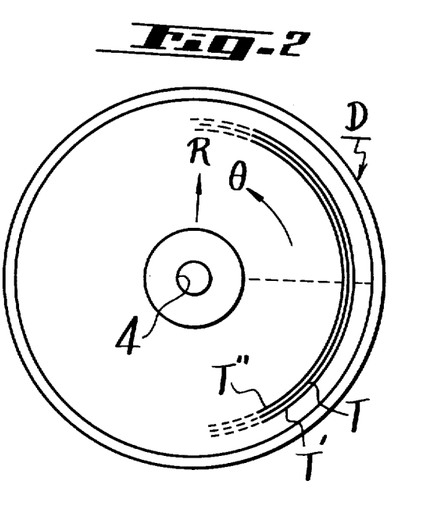
FIG. 2 is a schematic plan view of one embodiment of an optical recording disc in accordance with this invention.

An embodiment of the present invention will be hereinafter described with reference to FIGS. 2 to 19. As shown in FIG. 2, the recording and/or reproducing system according to this invention makes use of a record disc D (the diameter thereof being 30 cm, by way of example) as the recording medium. The illustrated record disc D is generally similar to an ordinary audio record disc, but differs from the latter in that a metallic layer is plated on a base disc made of a material which may be the same as that used for audio record discs (for example, a synthetic resin, such as vinyl chloride). A transparent oxide layer of metal is coated on the metallic layer or plating for protection and a mirror like finish is applied to the oxide layer.

A bore 4 is formed through record disc D at its center, and a spiral record track forming a number of generally circular turns or tracks T', T, T'', . . . is formed on the surface of record disc D. By way of example, the width of the record track may be from about 0.4 to 0.5mm and a spiral guard band is formed between the adjacent circular turns or tracks. A laser light beam may scan the guard band or portion between the adjacent tracks to detect whether a carrier exists thereon or not and a tracking servo may be applied based upon such detection. In order to facilitate understanding of the following description of the record disc D, it will be assumed that the radius or radial direction of the record disc is R and its circumferential direction is θ.

Figure 3:
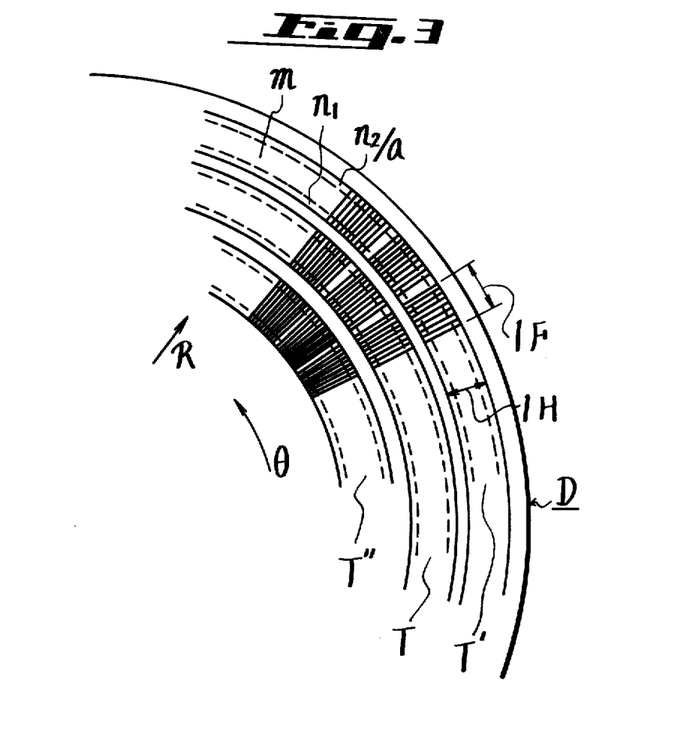
FIG. 3 is an enlarged, fragmentary plan view of a part of the disc in FIG. 2, showing the positional relationship between adjacent tracks.

As shown on FIG. 3, the successive records of the signal are formed on record disc D across the width of the record tracks T, T', T'', that is, in the radial direction R of the record disc D.

The successive records in the radial direction R consist of rectangular depressions aligned in a line or row. The positions or lengths of the rectangular depressions are varied in the radial or line scanning direction. The rectangular depressions are the same in width (direction perpendicualr to the scanning direction) and depth, for example, both the width and depth may be 1μ.

In the illustrated embodiment of the invention, a pulse-phase modulated video signal, front and back pilot signals and a pulse-width modulated autio signal are recorded on the record track T of record disc D. As may be apparent from FIGS. 2 and 3, in the direction from the center of record disc D toward its outer periphery, on each scanning line (in the radial direction R) there are provided a record portion $n_1$ for the front pilot signal, a record portion $m$ for the video signal, a record portion $n_2$ for the back pilot signal and a record portion $a$ for the audio signal. The widths and positions of these record portions $n_1$, $m$, $n_2$ and $a$ are the same in the successive radial scanning lines which appear sequentially in the circumferential direction of the record track T.

Figure 6A:
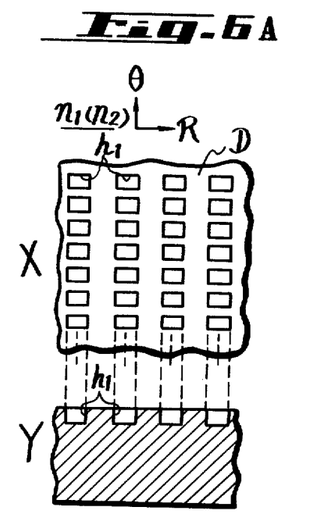
FIGS. 6A, 6B and 6C are detailed plan and sectional views showing the modulation forms in each signal section shown in FIG. 4.
Figure 6B:
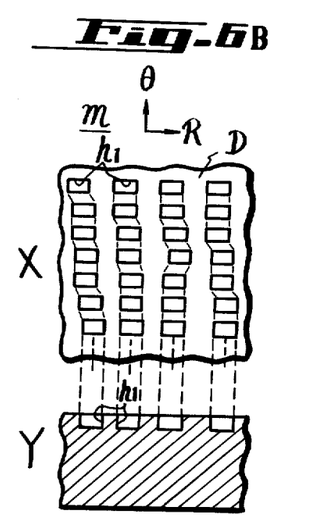
Figure 6C:
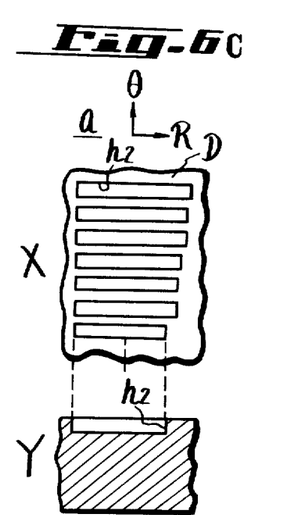

FIGS. 6A, 6B and 6C respectively show parts of the recorded track T in plan at X and in cross-section at Y. FIG. 6A shows a part of the front and back pilot signal record portion $n_1$ and $n_2$, FIG. 6B shows a part of the video signal record portion $m$, and FIG. 6C shows a part of the audio signal record portion $a$. As shown in FIG. 6A, depressions $h_1$ are the same in length in the scanning or radial direction R of the record disc D and are arranged to form equally spaced parallel rows in the extending direction of the record track T, that is, in the circumferential direction $\theta$ of the record disc D. In FIG. 6B, the depressions $h_1$ are of the same length as in FIG. 6A, but appear in irregular rows in the circumferential direction $\theta$ by reason of the fact that the depressions $h_1$ are shifted in position in the radial direction R in accordance with the level of the video signals. In FIG. 6C, the depressions $h_2$ are shown to be longer than the depression $h_1$ in FIGS. 6A and 6B and differ in length from one another in accordance with the level of the audio signals, with the depressions $h_2$ being arranged to form a single row in the circumferential direction $\theta$.

Returning to FIGS. 2 and 4, it will be seen that the width of the record track T corresponds to one horizontal period (1H) of the television signal $S_T$ of the NTSC system and that the video signal portion $S_V$ of synchronizing television signal $S_T$ corresponds to the video signal record portion $m$ of the record track T. Further, it will be seen that front pilot signal portion $n_1$ of the record track T corresponds to the end portion of the back porch of the television signal $S_T$, that the part from the front porch to the middle of the horizontal synchornizing signal $S_H$ of the television signal $S_T$ corresponds to the back pilot signal portion $n_2$, and that the part from the middle of the horizontal synchronizing signal $S_H$ to the initial portion of the back porch of the television signal $S_T$ corresponds to the audio signal portion $a$.

Figure 4:
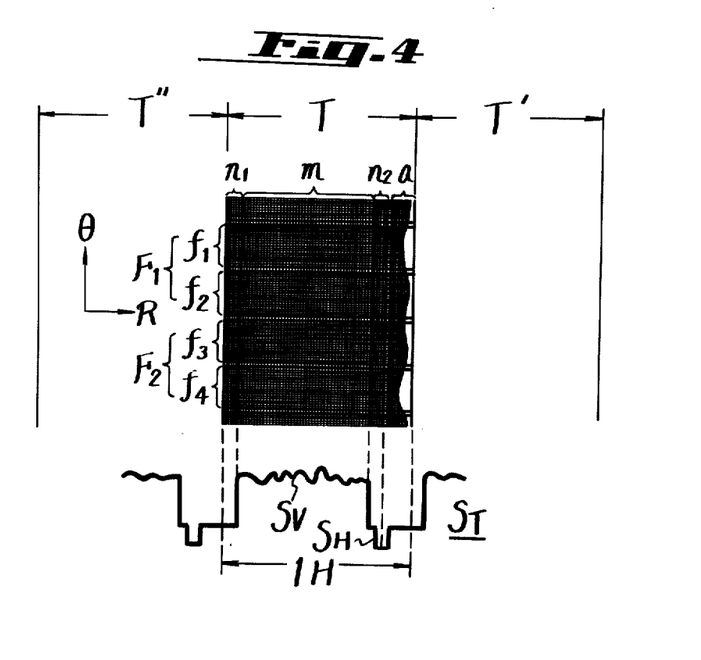
FIG. 4 is a further enlarged projected view showing the arrangement of recorded signals on the disc corresponding to a composite television signal.
Figure 5:
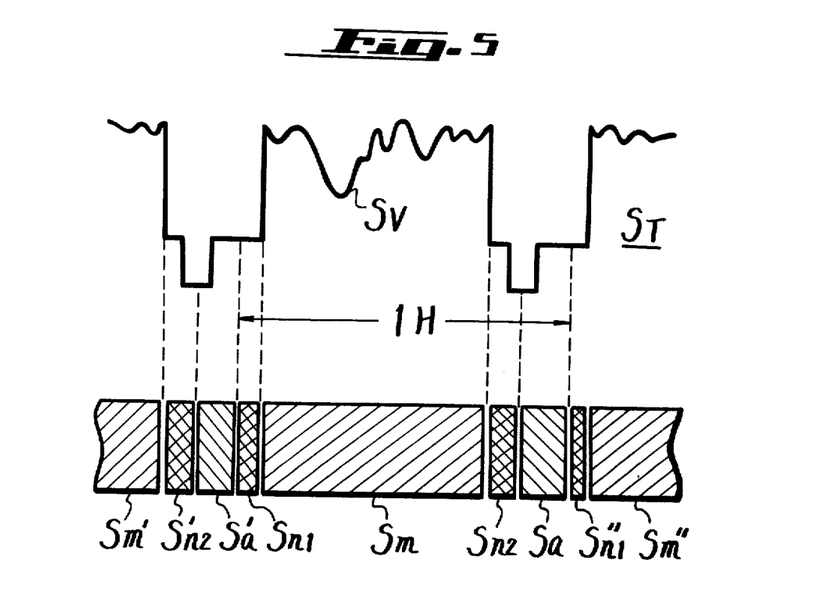
FIG. 5 is a diagrammatic view illustrating the signal arrangement of the modulated composite television signal.

When a pulse-phase modulated signal, which is obtained by modulating a carrier signal of about 4MHz with a modulating signal (video signal), is recorded in the video signal record portion $m$, there are 525 radially extending rows of the depressions $h_1$ arranged in the circumferential direction $\theta$ for each frame or 1/30 seconds, due to one horizontal period being 63.5$\mu$sec. In FIG. 4, reference symbols $f_1, f_3, f_2, f_4$ indicate groups of radially directed scanning lines which correspond to odd and even fields of the NTSC system television signal, and $F_1$ and $F_2$ indicate groups of the scanning lines coresponding to respective frames consisting of odd fields $f_1, f_3$ and even fields $f_2, f_4$. Since the number of the scanning lines for each frame is 525, and if the width of each depression $h_1$ is selected to 1$\mu$, then the track length for accommodating one frame signal may be no greater than about 0.525 mm. Accordingly, if the diameter of the record disc D is 30cm, the recording and/or reproducing of a video signal for over one hour can be achieved on a single disc.

As shown by broken lines on FIG. 6B, it is possible to arrange the depressions $h_1$ which form the adjacent scanning lines close to each other, or even abutting in the circumferential direction $\theta$. With such closely adjacent or abutting rows or depressions, no tracking is required for scanning along the width direction of the record track during reproduction.

In the recording of signals on the above record disc D, the corresponding depressions can be directly applied thereto, but this is not preferred for mass-production of the record discs. Therefore, as in the case of conventional phonograph records, a master record (stamper) disc is initially prepared and a number of record discs D or replicas are reproduced therefrom.

Figure 7A:
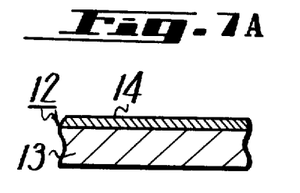
FIGS. 7A-7E are fragmentary cross-sectional views illustrating various steps in the manufacturing of the record disc medium.
Figure 7B:
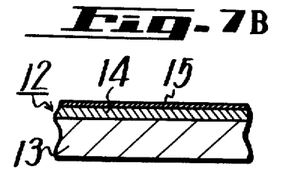
Figure 7C:
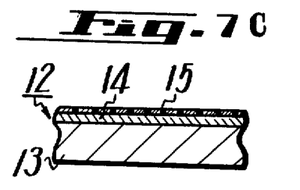
Figure 7D:
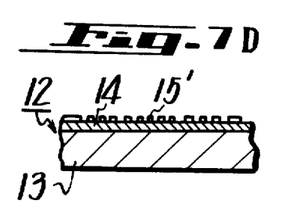
Figure 7E:
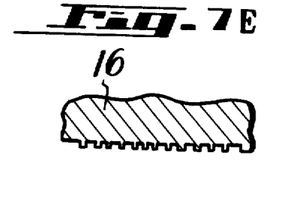

The manufacture of the master record disc will now be described with reference to FIGS. 7A–7E. As shown in FIG. 7A, a mother disc 12 is provided which consists of an aluminum base 13 and a lacquer layer 14 coated on the base 13. A photo-resist layer 15 is then coated on the lacquer layer 14, as shown in FIG. 7B. The photo-resist layer 15 is exposed to a light beam, such as a laser light beam or electron beam, as hereinafter described with reference to FIG. 8, so as to expose layer 15 with a predetermined pattern as shown in FIG. 7C. The exposed photo-resist layer 15 is subjected to a developing process to form a hardened photo-resist layer 15' which has a number of grooves or depressions therein corresponding to the record track T to be obtained, as shown in FIG. 7D. A metallic layer of a predetermined thickness is plated on the photo-resist layer 15', and then the mother disc 12 is peeled off from such metallic layer to have a stamper 16 with a predetermined raised pattern, as shown in FIG. 7E. A number of record discs D can be reproduced from stamper 16 by heat-pressing vinyl chloride thereagainst, whereupon the presseed vinyl chloride, or a metal layer applied thereto, is subjected to a mirror-like working process.

Figure 8:
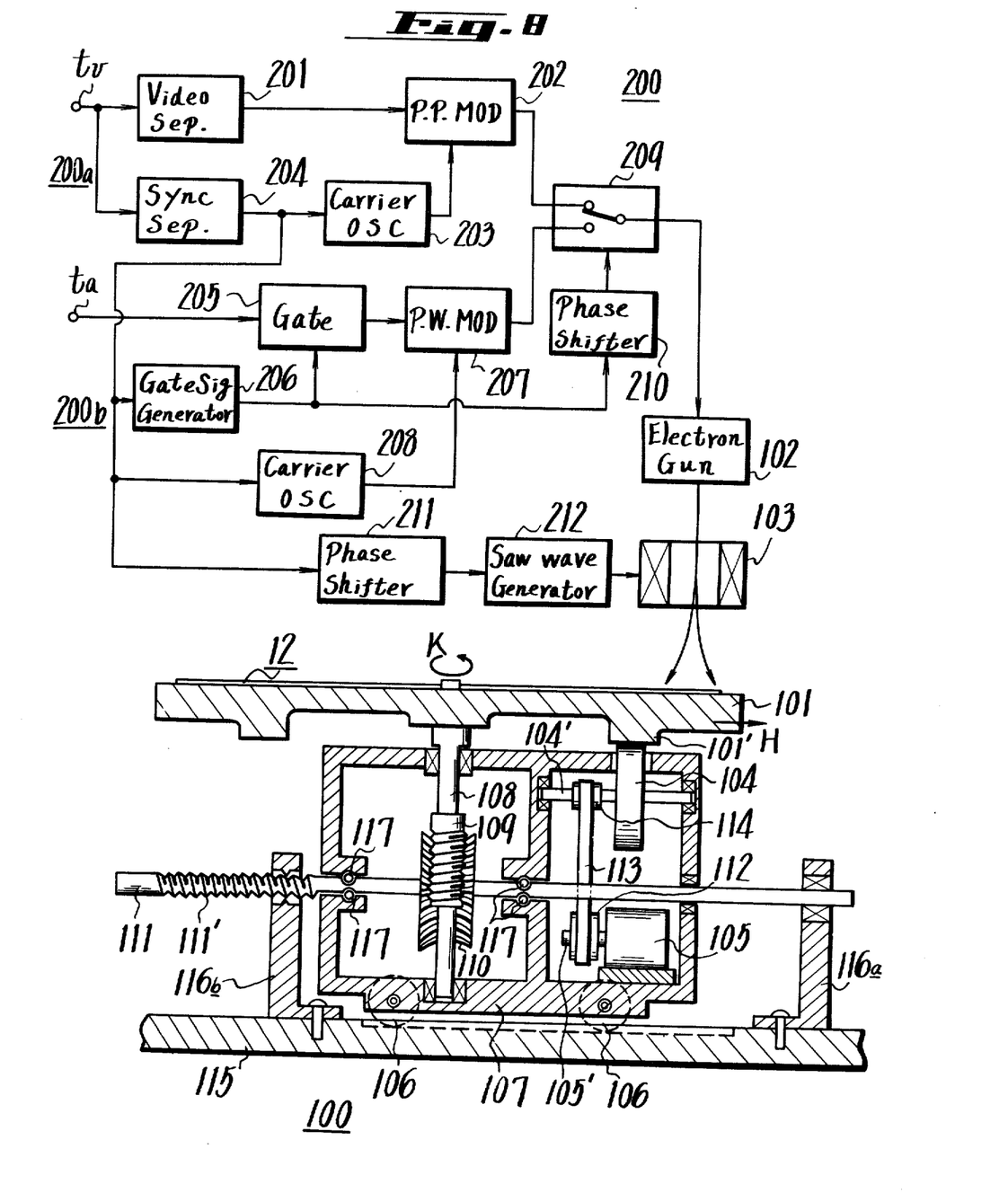
FIG. 8 is a schematic view of a signal recording apparatus according to one embodiment of the invention.

Referring now to FIG. 8, it will be seen that a video recording machine 100 for exposing the photo-resist layer 15 of the mother disc 12 (FIG. 7C) in a pattern, that corresponds to the signals to be recorded includes a turntable 101 for supporting mother disc 12, an electron gun 102 which emits an electron beam for exposing the photo-resist layer 15 on the mother disc 12 and 1 deflection coil 103 which may deflect the electron beam in the radial direction of the mother disc 12 by the width (for example, 0.98mm) of the record track. The recording of signals, by the exposure of photo-resist layer 15 of mother disc 12, is effected in a spiral record track extending from the outer circumference to the inner circumference of mother disc 12 at a constant linear or recording speed in the circumferential direction along the record track. In order to define the spiral record track, the electron gun 102 and deflection coil 103 are fixed, while the turntable 101 is gradually moved from the position shown in the direction of the arrow H, and the turntable 101 is rotated, as indicated by the arrow K, at a rotational speed which is gradually increased.

In order to drive turntable 101, a ring shaped projection 101' is formed on the undersurface of the turntable and is contacted by an idler 104 which is rotated by a motor 105. In this case, the motor 105 is driven at a gradually increasing speed so that the turntable is rotated, through the idler 104, at a constant linear speed at the region of the laser beam (for example, a linear speed of 15mm/sec). The turntable 101 is rotatably supported, at its shaft 108 in bearings on a carrier 107 which is supported by rollers 106 on a chassis 115. A worm gear 109 is formed on shaft 108 of turntable 101 and a worm wheel 110 meshes with worm gear 109 and it attached to a shaft 111 having a screw 111' formed on one end portion thereof.

In the illustrated video recording machine 100, the rotation of motor 105 is transferred to idler 104 for rotating turntable 101 through a pulley 112 attached to the rotary shaft 105' of the motor and a belt 113 stretched between pulley 112 and a pulley 114 attached to a shaft 104' of idler 104. The shaft 111 is held against axial movement relative to carrier 107 in ball bearings 117. One end portion of shaft 111 is rotatable and axially slidable in a bearing carried by a bracket 116a on chassis 115, while the screw 111' on the other end portion extends threadably through a nut or threaded bore in a bracket 116b. It will be seen that rotation of turntable 101 causes rotation of worm wheel 110 meshed with the worm gear 109 formed on the shaft 108, so that screw 111' causes movement of the carrier 107 and the turntable 101 in the direction of the arrow H. The rotational speed of motor 105, and hence of the turntable 101, is gradually increased in accordance with the movement thereof in the direction H, and the speed variation of the turntable 101 is from about 1.03 to 3.0 r.p.m. for the case of a mother disc 12 with an outer diameter of 30cm (in which the outer portion from the inner diameter of 10cm is used for recording). In other words, the recording speed in the circumferential direction of the record track on disc 12 is made constant. After the turnable 101 is moved in the direction H and the exposure and recording of the lacquer disc 12 by the electron beam is finished, the shaft of feeding screw 111' may be rotated by a clutch motor (not shown) to rapidly move the carrier 107 and turntable 101 in the direction opposite to the arrow H. At this time, the idler 104 is preferably moved away from the turntable 101 by a suitable device (not shown).

A record circuit system 200 for recording signals on the lacquer disc 12 will now be described with reference to FIG. 8 and is shown to include a video signal record circuit system 200a and an audio signal record circuit system 200b. In the video signal record circuit system 200a, an input termina $t_v$ is supplied with a composite video signal (television signal which is applied therefrom to a video separator 201. The video separator 201 eliminates the horizontal synchronizing signal of the horizontal blanking signal, and the front porch and the back porch from the composite video signal applied thereto, and applies the remaining field video signal to a pulse modulator 202 which, in the embodiment being described, is of pulse-phase modulator type. The pulse-phase modulator 202 is further supplied with a carrier signal from a carrier oscillator 203 which, in consideration of the band of the video signal, has an oscillation frequency of 4MHz. The carrier oscillator 203 is locked by the horizontal synchronizing signal which is separated by a sunchronizing signal separator 204 from the composite video signal applied to input terminal $t_v$. From the pulse-phase modulator 202 there are obtained, in each horizontal period (1H), a pulse-phase modulated signal $S_m$, which is the carrier pulse signal from oscillator 203 pulse-phase modulated by the video signal, and front and back pilot signals $S_{n1}$ and $S_{n2}$ consisting of non-modulated carrier pulse signals.

The audio signal recording circuit system 200b is shown to include an input terminl $t_a$ supplied with an audio signal in correspondence with the video signal. The audio signal is applied from terminal $t_a$ to a gate circuit 205 in which it is sampled at the horizontal frequency of the video signal. A gate signal generator 206 is supplied with the output signal from the synchronizing signal separator 204 and generates a gate signal which has a predetermined phase relative to the horizontal synchronizing signal separated from the composite video sitnal and a predetermined width. Such gate signal from the gate signal generator 206 is applied to gate circuit 205 to control the latter. The audio signal sampled by gate circuit 205 is applied to a pulse modulator 207 to produce a pulse modulated signal in which the audio signal has a band of about 7.5KHz. The pulse modulator 207 is of the pulse-width modulating type. A carrier oscillator 208 is supplied with the output signal from the separator 204 and produces a carrier signal which is applied to the pulse modulator 207. The carrier oscillator 208 is a pulse oscillator with the oscillation frequency thereof being the same as the horizontal frequency (15.75KHz) and is locked by the horizontal synchronizing signal separated from the composite video signal.

The output signals from modulators 202 and 207 are alternately applied through a chante-over switch 209 to electron gun 102. The switch 209 is controlled by the output signal from the gate signal generator 206 through a phase shifter 210. The output signal of the separator 204 is supplied through a phase shifter 211 to a saw-wave signal generator 212 and the saw-wave signal from the latter is applied to deflection coil 103 which deflects the electron beam from gun 102 in the radial direction of record 12, whereby the electron beam is made to scan across the width of the track during each horizontal line period. The signal applied through switch 209 to the electron gun 102 is a continuous series of signals which, for each horizontal line period 1H (FIG. 5) consist of the front pilot signal $S_{n1}$, the pulse-phase modulated signal $S_m$, the back pilot signal $S_{n2}$ and the pulse-width modulated signal $S_a$ of the audio signal. Thus, the electron beam from the electron gun 102 is modulated by the foregoing signal applied thereto.

Figure 9:
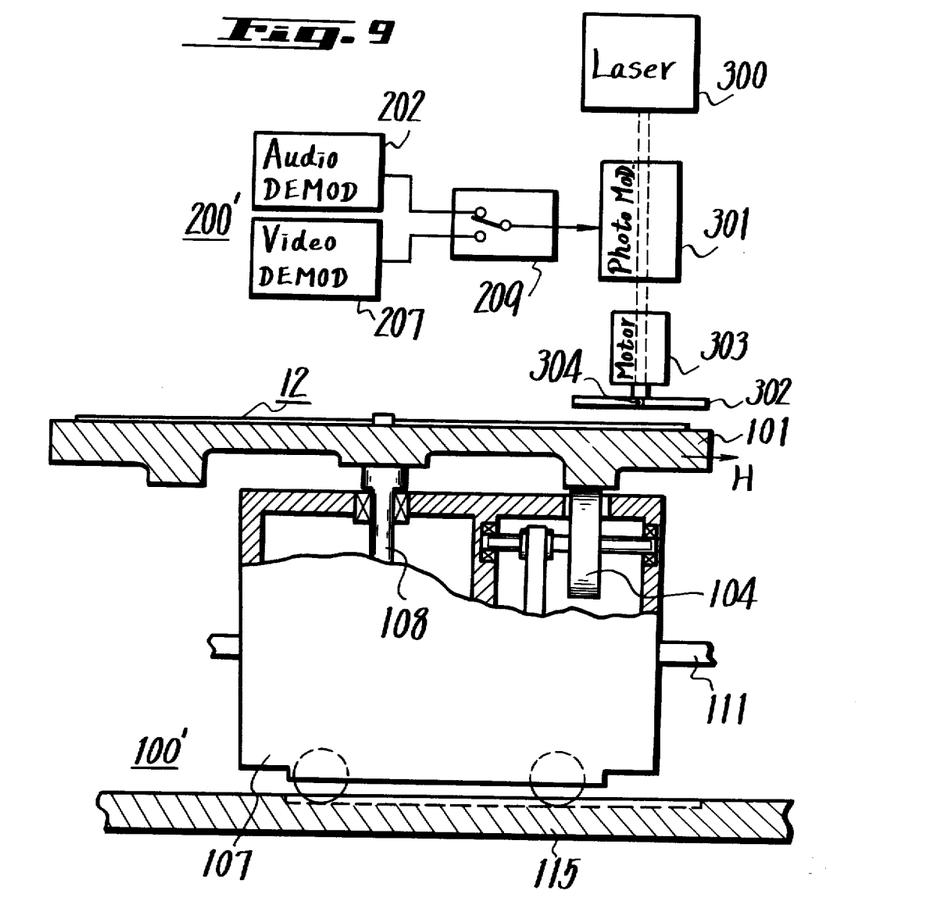
FIG. 9 is a schematic view showing part of another embodiment of a video recording apparatus according to this invention.
Figure 10:
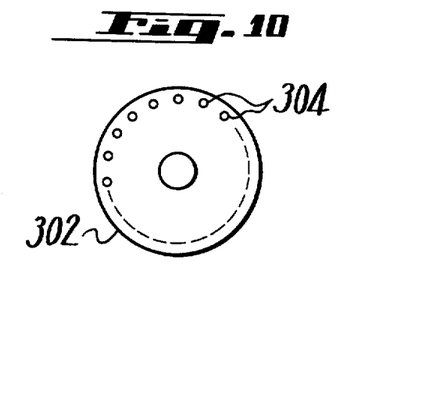
FIG. 10 is a plan view of an optical shutter used in the apparatus depicted in FIG. 9.
Figure 12:
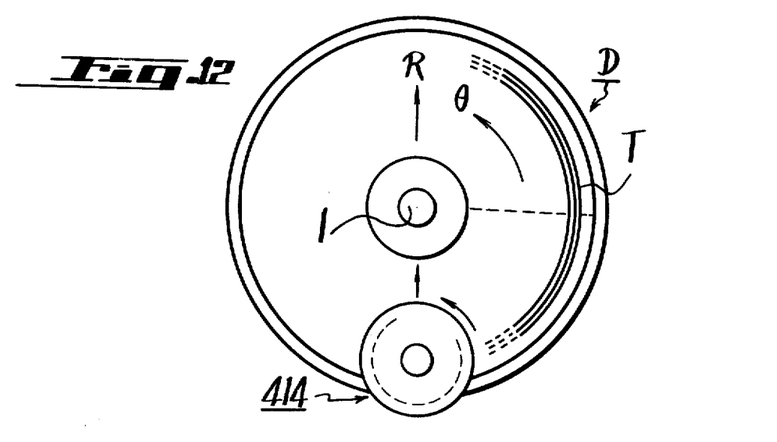
FIG. 12 is a plan view showing the relationship between the optical shutter and record disc used in the apparatus depicted in FIG. 11.

Another recording apparatus 100', in which a light beam, especially a laser light beam, is projected onto mother disc 12 to expose the same, is shown on FIG. 9 in which the reference numerals used on FIG. 8 are employed to identify the corresponding elements on FIG. 9 and only the demodulators 202 and 207 and switch 209 of the recording circuit 200' are shown. The recording apparatus 100' includes a laser generator 300 of HeNe or the like producing a laser light beam which is photo-modulated by a photomodulator 301, made of crystalline material or the like, and which is supplied with the signal passing through switch 209 in the recording circuit 200'. The photo-modulated laser beam is converted by an optical shutter 302 into a similarly photo-modulated laser beam that is deflected, during each horizontal line period, across the width of the record track to be recorded on disc 12. Such deflected laser beam is projected onto the photoresist layer on disc 12 to expose that layer. As shown on FIG. 10, the optical shutter 302 is a disc (the diameter thereof being about 75mm) having formed therethrough a number of equally spaced apertures 304 arranged in a circle concentric with the disc 302, and disc 302 is rotated by a motor 303 at a constant speed. The axis of rotation of disc 302 is selected so that the circular path of its apertures 304 is interposed in the path of the laser beam and extends substantially across the width of the record track where the latter is being recorded (FIG. 12). The pitch or spacing between the apertures 304 of the optical shutter 302 is approximately equal to the width of the record track and the diameter of each aperture 304 is in the order of 1.5 $\mu$. The number of the apertures 304 is a quotient of 525 (which is the number of the horizontal scanning lines of the NTSC television signal) resulting from the division of that number by a positive integer, for example, 175=525 × (1/3). In the case where the optical shutter 302 has 175 apertures, the shutter is rotated at the speed of 5400 r.p.m. The optical shutter 302 may be formed of a glass disc coated as by evaporation, with a thin bismuth layer, and then attached to the motor 303, with the apertures 304 being bored through the bismuth layer by pulse operation of the laser beam while the shutter is rotated at the constant speed.

The reproduction of information recorded on the recording medium or record disc D, as above, will now be described with reference to FIG. 11 in which an example of a reproducing apparatus is generally identified as 400. In apparatus 400, a light beam, for example, a laser beam, is projected onto the record track T on the record disc D to scan the record track T across the width thereof, that is, in radial direction R of the record disc D while the latter is rotated and to optically detect the depressions $h_1$ and $h_2$. More specifically, apparatus 400 is shown to include a turntable 401 on which the record disc D is mounted. The turntable 401 is driven by a motor 402. The turntable 401 is mounted on a chassis 403 and its shaft 404 is directly coupled to the rotary shaft of motor 402. The motor 402 has its speed controlled by a servocircuit 405 which is supplied with a reference signal from a reference signal generator 406 so as to maintain a constant linear speed at the portion of the record track on disc D being scanned by the laser beam.

A photo-detecting assembly 410 is provided in opposed relation to the record disc D so as to read out the information recorded on disc D. The photo-detecting assembly 410 is a unit that is movable in the direction of the arrow J, that is, radially in respect to turntable 401, and includes a laser beam generator 411 producing a laser beam that is converted through a photo-condenser 413 and an aperture P of an optical shutter 414 into a beam that it is deflected across the width of the record track T, whereupon, the deflected laser beam is projected through a half mirror 415 and a lens 416 onto record disc D to scan the record track T thereon in its width direction. The laser beam reflected from the record disc D is received by a photo-sensor 417 through the lens 416 and half mirror 415.

Figure 13:
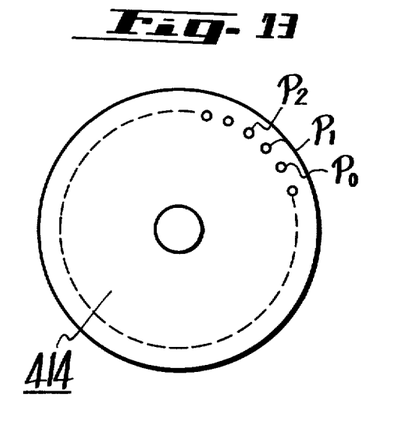
FIG. 13 is an enlarged plan view showing the optical shutter used in the appratus of FIG. 11.
Figure 14:
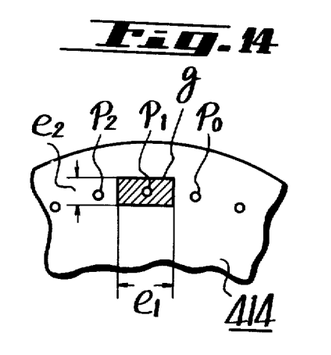
FIG. 14 is a further enlarged plan view of a part of the optical shutter shown in FIG. 13.

As shown on FIGS. 12–14, the optical shutter 414 is similar to the so-called Nipkow's disc, and hence is a disc having formed therethrough a number of equally spaced apertures $p_0, p_1, p_2$ . . . arranged in a circle concentric with the disc and being rotated by the motor 412 at a constant speed. The pitch or spacing between the apertures $p_0, p_1, p_2$ . . . of optical shutter 414 is substantially equal to the width of the record track T and the diameter of each aperture is, for example, on the order of 1 to 1.5 $\mu$. The number of the apertures $p_0, p_1, p_2$ . . . is a quotient of 525, which is the number of the horizontal scanning lines of the NTSC television signal, divided by a positive integer, for example, 175(=525×(1/3)). In this case, the optical shutter 414 is rotated at the speed of 5400 r.p.m., and its diameter is about 75mm. In general, it may be desired that the optical shutter 414 have a small diameter and be relatively thin for eliminating the jitter caused by rotation. By way of example, the optical shutter 414 may be made from a glass disc with a thin bismuth layer deposited thereon by evaporation, whereupon the disc is attached to the motor 412 and the apertures $p_0, p_1, p_2$ . . . are bored through the bismuth layer by the pulse operation of the laser beam.

The laser beam emitted from laser generator 411 and projected onto optical shutter 414 has the cross-sectional configuration g shown in FIG. 14. Thus, the dimension $e_1$ of the beam in the circumferential direction of the optical shutter disc 414 is equal to the width of the record track T and the beam dimension $e_2$ in the radial direction of the disc 414 is slightly greater than the diameter of the apertures $p_0, p_1, p_2$ . . . , if the magnification of the lens 416 is taken as 1.

Figure 11:
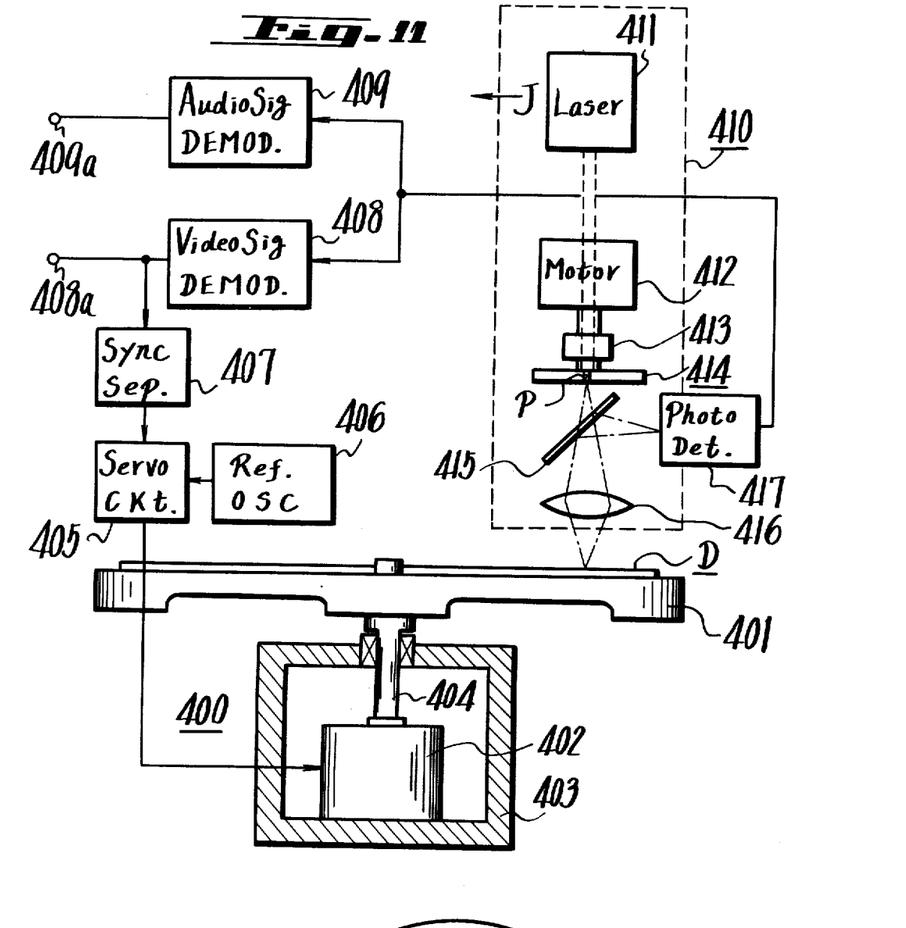
FIG. 11 is a schematic view of a video reproducing apparatus according to an embodiment of this invention.

As previously noted, laser generator 411, optical shutter 414, photo-condenser 413, half-mirror 415, lens 416, photosensor 417 and motor 412 constitute the photo-detecting assembly 410 which is moved, as a unit, from the outer periphery toward the center of the record disc D at a constant speed in the direction of the arrow J on FIG. 11 by a suitable driving device (not shown). The laser beam scans the record track T on the record disc D at a constant linear speed in the circumferential direction of the track T. To this end, turntable 401 is rotated by motor 402 at a rotational speed that increases as the laser beam moves from the outer periphery toward the center of the record disc D in response to the movement of displacement of assembly 410.

With the reproducing apparatus described above, the light beam passed through a certain aperture, for example, the aperture $p_0$ of the optical shutter 414, scans the row of depressions $h_1$ and $h_2$ along a certain scanning line extending across the record track T on the record disc D, and the light beam passed through the following aperture $p_1$ scans the row of depressions $h_1$ and $h_2$ along the following scanning line extending across the recorded track T. During such scanning, the light or laser beam is focussed on, for example, the reflective surface (mirror surface) of record disc D but not focussed on the bottom of depressions $h_1$ and $h_2$. For this reason, the reflected light beam is detected by the photo-sensor 417 through the half mirror 415 only when the light beam is projected onto the reflective or mirror-like surface of the record disc D. The photo-sensor 417 thus produces a signal corresponding to the signal recorded on the record track T of the record disc D. Such reproduced signal from photo-sensor 417 is applied to a video signal demodulator 408 and to an audio signal demodulator 409. The video and audio signal demodulators 408 and 409, embodiments of which will be hereinafter described in detail, produce video and audio signals at their output terminals 408a and 409a, respectively. The video signal from demodulator 408 is also supplied to a synchronizing signal separator 407 which separates the vertical synchronizing signal from the demodulated video signal. The separated vertical synchronizing signal is applied to servo circuit 405 and is compared with the reference signal from the reference signal generator 406. Thus, the servo system is formed which controls the speed of motor 402 to ensure that turntable 401 is rotated at a constant linear speed (considered at the radial distance from its center where the laser beam is directed) and hence the reproduction of the recorded signal is synchronized with the rotation of the record disc D.

With the above described embodiment of the invention, when the light beam scans the record disc D at its outer portion (about 30 cm in diameter), the rotational speed of turntable 401 is about 1 r.p.m., and the rotational speed is increased to about 3.0 r.p.m. when light beam scans the inner portion (about 10cm in diameter) of the record disc D. Such rotational speeds are calculated as follows: If the diameter of the record disc D is 30cm, its outer circumference circle is 94.2cm. Since the length of the record track for recording one frame signal is selected to be about 0.525mm, approximately 1800 frames ($942 \div 0.525 \approx 1800$) can be recorded in the outermost track disc D. Since the period of one frame of the television signal is 1/30 second, the time interval $t$ for one revolution of record disc D when recording at its outer periphery is 60 seconds ($t=1800 \times (1/30)$). Accordingly, the rotational speed of the record disc D is about 1 r.p.m. when recording or reproducing at its outer periphery, and similarly about, or at most, 3.0 r.p.m. when recording or reproducing at its mid-portion (about 10cm in diameter). Therefore, it will be apparent that, in recording or reproducing according to this invention, the rotational speed of the record disc is very low, as compared with the rotational speed of 1500 r.p.m. required in the prior art and, accordingly, the phase servo or speed servo for the record disc can be easily applied.

Figure 15:
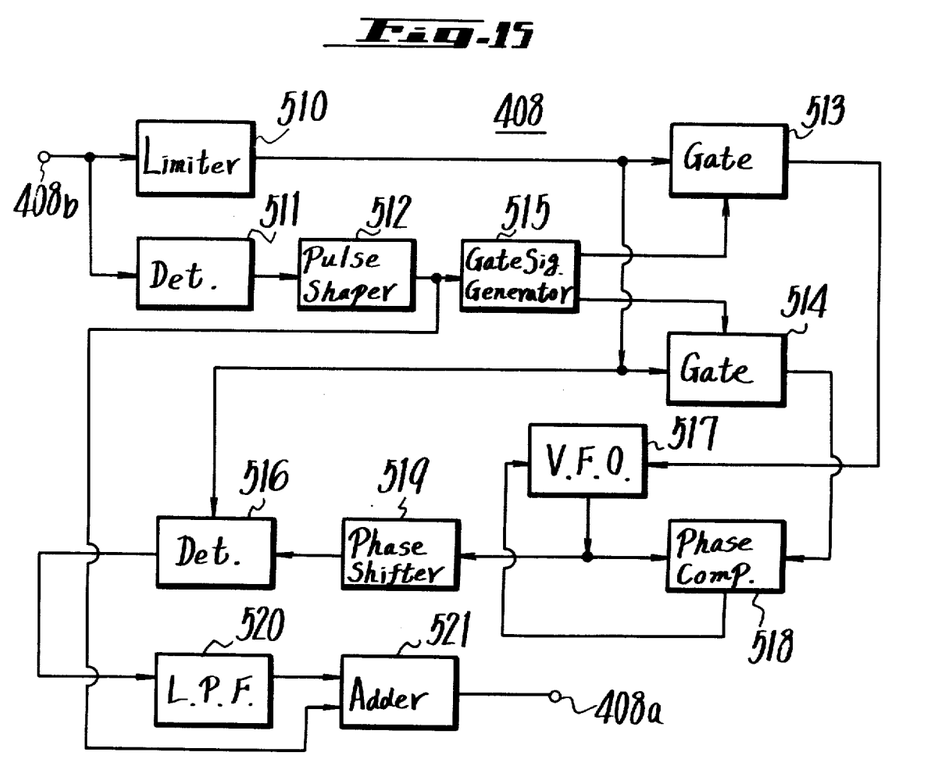
FIG. 15 is a schematic diagram showing an embodiment of a vide signal modulator used in the apparatus of FIG. 11.

An example of the video signal demodulator 408 will be now described with reference to FIG. 15. The demodulator 408 is shown to be supplied, at its input terminal 408b, with a signal similar to that appearing on FIG. 5, and this signal is applied to a limiter 510 and to an envelope detector 511. The detector 511 may consist of a diode and a band pass filter and applies its output signal to a pulse shaper 512 which produces the horizontal synchronizing signal. The output signal of the limiter 510 is applied to gate circuits 513 and 514 for extracting the front pilot signal $S_{n1}$ and back pilot signal $S_{n2}$, respectively. The gate signal applied to gate circuits 513 and 514 is produced by a gate signal generator 515 which is supplied with the horizontal synchronizing signal from pulse shaper 512. The output signal of the limiter 510 is also applied to a phase detector 516 which detects the video signal. The detecting or carrier signal for the pulse-phase modulated signal $S_m$ which is used for detection of the video signal in detector 516 is produced as follows: The front pilot signal $S_{n1}$ from gate circuit 513 is applied to a variable frequency oscillator 517 which is forcibly locked at the phase of the signal $S_{n1}$. However, if the oscillator 517 is controlled only by the front pilot signal $S_{n1}$, its phase is shifted after the end of the horizontal scanning period arrives or its oscillation frequency is not determined. Accordingly, a phase comparator 518 effects a phase comparison between the output signal of variable frequency oscillator 517 and the back pilot signal $S_{n2}$ from gate circuit 514, and applies the compared output signal to oscillator 517 to control its oscillation frequency. The output signal from oscillator 517 is also applied to the phase detector 516 through a 90° phase shifter 519. The output signal from phase detector 516, that is, the pulse-demodulated video signal, is applied through a low pass filter 520 to an adder 521 which is also supplied with the horizontal synchronizing signal from pulse shaper 512 and which produces the composite video signal at its output terminal 408a.

With the circuit construction described above, since the phase of the detecting signal used for detecting the reproduced video signal is controlled by the front pilot signal $S_{n1}$ and the frequency is controlled by the back pilot signal $S_{n2}$, even if the distance between the adjacent apertures of optical shutter 414 varies somewhat, the initial phase and oscillation frequency of the detecting or carrier signal from the variable frequency oscillator 517 can be made to coincide with the phase and frequency of the carrier signal from the pulse-phase modulated signal so as to achieve accurate demodulation.

Figure 16:
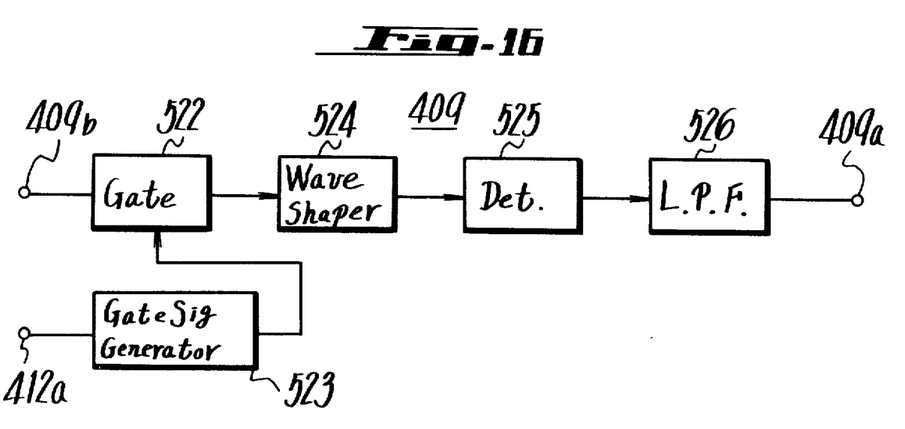
FIG. 16 is a schematic diagram showing an embodiment of an audio signal demodulator used in the apparatus of FIG. 11.

An example of the audio signal demodulator 409 will now be described with reference to FIG. 16 in which it is shown to have an input terminal 409b also supplied with a signal similar to that shown on FIG. 5, which signal is applied to a gate circuit 522 for extracting therefrom the pulse-width modulated audio signal S. The gate signal for controlling gate circuit 522 is produced by a gate signal generator 523 which is supplied with the horizontal synchronizing signal from an output terminal 412a of pulse shaper 512 on FIG. 15. The output signal from gate circuit 522 is applied through a wave shaper 524 to a demodulator 525 which is of the pulse-width demodulating type. The demodulated audio signal from demodulator 525 is delivered through a low pass filter 526 to output terminal 409a.

The record track T formed on the record disc D may be constituted by a number of concentric circles rather than by a spiral track having substantially circular turns that are continuously connected. Further, one of the front and back pilot signals $S_{n1}$ and $S_{n2}$ in the signals recorded on the record disc D can be omitted.

The video signal, as recorded on the record disc D, may be its pulse-width modulated signal, however, the pulse-phase modulated signal, as described above, is preferred for transmission of a wide band.

In the reproducing apparatus shown on FIG. 11, if the incident angle of the light beam scanning the record disc D is made greater than 90° with respect to the surface of the record disc D, the half mirror 415 may be removed from the path of the light or laser beam, with the result that the light beam can be used more effectively for scanning record disc D.

Figure 17:
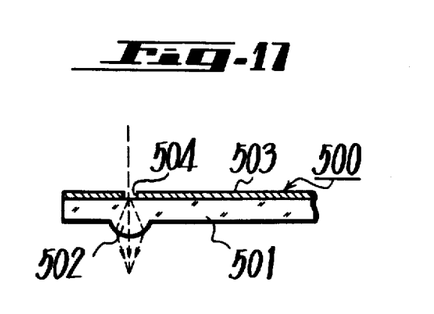
FIG. 17 is a fragmentary cross-sectional view showing another embodiment of an optical shutter that may be used in reproducing apparatus according to this invention.

An optical shutter 500 according to another embodiment of the invention will be now described with reference to FIG. 17. In this embodiment, a lens 502, functionally corresponding to the lens 416 used in the device of FIG. 11, is provided directly on shutter 500 in association with each aperture. More specifically, in shutter 500, a transparent glass disc 501 is provided with the lenses 502 on one surface thereof, and is coated with a light shielding layer 503 on the other surface thereof. An aperture 504 is bored through the light shielding layer 503 at the position corresponding to each lens 502. The associated apertures 504 and lenses 502 are arranged in correspondence with the apertures $p_0, p_1, p_2 \ldots$ of the optical shutter 414 shown in FIG. 13.

In manufacturing the optical shutter 500, transparent glass disc 501 with a number of lenses 502 formed on one surface thereof is first prepared, and then a photosensitive layer is coated on the other surface of disc 501. Thereafter, transparent disc 501 is rotated at a constant speed, and light passing through a pin hole from a flash light source is projected through disc 501 onto the photo-sensitive layer at the positions corresponding to the lenses 502. The photo-sensitive layer is then subjected to a reversedevelopment process to form the light shielding layer 503 with the apertures 504. In this case, even if the positions of the lenses 502 on the transparent disc 501 are slightly incorrect, the apertures 504 formed through the light shielding layer 503 can be properly aligned with the positions of the respective lenses. Further, the optical shutter 500 simplifies the optical system that is required for use therewith. The apertures 504 formed through the light shielding layer 503 need not be so small in diameter, for example, they may be 5 $\mu$ in diameter, so that the diffraction loss of the laser beam at the apertures 504 is reduced.

The above described optical shutters 414 and 500 are used for reproducing the video signal from the record disc D in the same form as the video signal was recorded on the latter.

Thus, with shutters 414 and 500, the recorded video signals corresponding to successive frames of a picture are reproduced at the original sequence and frame frequency.

Figure 18:
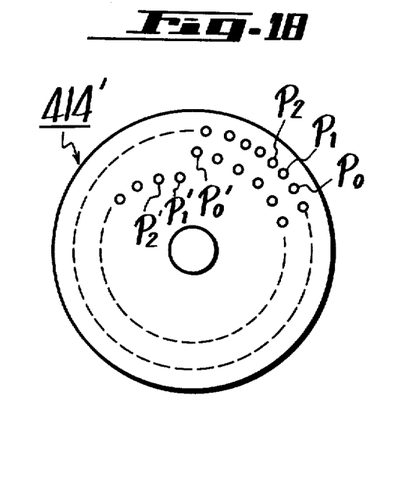
FIG. 18 is a plan view showing still another embodiment of an optical shutter.
Figure 19:
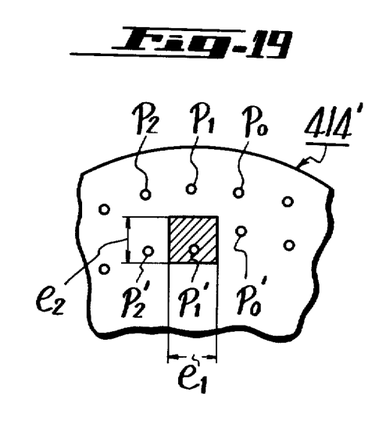
FIG. 19 is an enlarged fragmentary plan view of a part of the optical shutter shown in FIG. 18.

Referring now to FIGS. 18 and 19, it will be seen that an optical shutter 414' for reproducing a still picture from the recorded video signal on the record disc D may have a number of apertures $p_0, p_1, p_2 \ldots$ which are the same as the apertures $p_0, p_1, p_2 \ldots$ of the optical shutter 414 shown on FIG. 13 so that optical shutter 414' can also be used for reproducing the video signal in the normal manner. Shutter 414 further has a number of apertures $p'_0, p'_1, p'_2 \ldots$ arranged along a spiral inside the circular array apertures $p_0, p_1, p_2 \ldots$ The pitch or spacing between apertures $p'_0, p'_1, p'_2 \ldots$ is selected to be substantially equal to the width of the record track T on the record disc D and the number of apertures $p'_0, p'_1, p'_2 \ldots$ is 525 so as to be equal to the number of scanning or horizontal lines in each frame in the NTSC television signal.

When a still picture is reproduced with the optical shutter 414', the turntable 401 (FIG. 11) on which the record disc D is mounted is held immobile, and the optical shutter 414' is rotated at a speed of 1800 r.p.m. with its axis being shifted laterally to cause the laser beam to pass through apertures $p'_0, p'_1, p'_2 \ldots$ rather than through apertures $p_0, p_1, p_2 \ldots$ In this case, the laser beam emitted from laser generator 411 (FIG. 11) is selected such that its cross-sectional dimension $e_1$ in the circumferential direction of the optical shutter disc 414' is equal to the width of the record track T and its cross-sectional dimension $e_2$ in the radial direction of the optical shutter disc 414' is the minimum sufficient for covering all the apertures $p'_0, p'_1, p'_2 \ldots$, as shown on FIG. 19. The remainder of the reproducing apparatus for reproducing a still picture may be substantially the same as described above for normal reproduction.

It will be apparent that, in accordance with the present invention as described above, spiral or circular record tracks are formed on the record disc and the time-modulated signals of information signals to be recorded are recorded on the record track in the direction extending across the circumferential direction of the record track so that the information signals, such as video signals, can be recorded on the record disc with high density. Further, upon reproduction of the recorded signals, the record disc is rotated at a very low speed so that the rotation can be easily controlled and the reproduction tracking can be also controlled easily.

In the above described embodiments of the invention, the information signals are recorded on the record disc as variations in the distances between successive pits or depressions. However, the recorded information signals may be represented by various mechanical shapes or magnetic patterns, by optical patterns of bright and dark portions with the recorded signals being read out by variations of light transmission through the record disc, or by variations of capacitances.

The time-modulated signal of the information signal which is recorded can be subjected to various types of modulation, such as pulse-time modulation, pulse-amplitude modulation (PAM), pulse-number modulation (PNM), pulse-position modulation (PPM) and so on.

Further the direction in which the record is scanned need not be precisely the direction of the width of the record track but may be at an angle thereto so that the scanning direction is obliquely related to the circumferential direction of the record track.

The information signals which can be recorded on the record disc are audio signals, data signals and the like, in addition to, or instead of the video signal.

In the above described reproducing apparatus 400, the light beam emitted from the light source is projected onto the record disc through the successive apertures of the optical shutter, but the latter may be replaced by a rotatable disc plate with photodiodes at positions corresponding to the apertures of the optical shutter.

Further, the front and back pilot signals may be the same as the carrier signals for the pulse-time modulated video signals themselves or frequency signals the frequency of which is $(1/n)$ or $n$ times that of the carrier signals.

Although illustrative embodiments of the present invention and various modifications thereof have been described in detail herein with reference to the accompanying drawings, it is to be understood that the invention is not limited to those precise embodiments and modifications, and that various changes and further modifications may be effected therein by one skilled inthe art without departing from the scope or spirit of the invention as defined in the appended claims.

What is claimed is:

1. A method of recording television signals having line and field intervals in substantially circular record tracks on a rotatable record disc, comprising the steps of:

pulse modulating the video information in each line interval of said television signals;

generating pilot carrier signals during at least a portion of each line interval of said television signal for use during subsequent playback of the recorded television signals to demodulate the video information;

repeatedly scanning successive scan lines across the width of one of said substantially circular record tracks, said scan lines being substantially transverse to the circumferential direction of said record track; and recording in each of said scan lines said pulse modulated video information to be recorded and said generated pilot carrier signals, said pilot carrier signals being recorded during at least a beginning or end portion of each of said scan lines.

2. The method according to claim 1; wherein the step of pulse modulating comprises pulse-time modulating a carrier signal with a portion of the signals to be recorded for providing corresponding pulse-time modulated signals, and said pulse-time modulated signals corresponding to at least one respective line interval of the video information to be recorded is recorded in said one record track during each said scanning of the latter in said direction across the width of the record track.

3. The method according to claim 1; wherein the step of pulse modulating comprises pulse-phase modulating a carrier signal with said video information for providing corresponding pulse-phase modulated video signals, and said pulse-phase modulated video signals corresponding to at least one respective line interval are recorded in said record track during each said scanning of the latter in said direction across the width of the record track.

4. The method according to claim 3; wherein said television signals are composite signals including video and audio signals and in which said carrier signal is pulse-width modulated with said audio signals for providing corresponding pulse-width modulated audio signals, and, during each said scanning across the width of said record track, said pulse-width modulated audio signals associated with the pulse-phase modulated video signals then recorded in said record track are also recorded in the latter.

5. The method according to claim 20; wherein said television signals are composite signals including video and audio signals and in which a carrier signal is pulse-width modulated with said audio signals for providing pulse-width modulated audio signals, and said pulse-width modulated audio signals associated with at least one respective line interval of the video signals are recorded with the latter during each said scanning of the record track in the direction across the width of the latter.

6. The method according to claim 1; in which said television signals are composite television signals comprised of video signals and horizontal blanking signals; and in which said pilot carrier signals have a predetermined frequency relative to the pulse modulating frequency and are recorded in said record track in correspondence to the horizontal blanking signal position.

7. The method according to claim 6; wherein said composite television signals also include audio signals and in which said carrier signal is also pulse modulated with said audio signals for providing pulse modulated audio signals, and, during each said scanning across the width of the record track, said pilot signals, pulse modulated video signals and pulse modulated audio signals are recorded, in series, in said direction across the record track.

8. The method according to claim 7; in which said pilot carrier signals are recorded at both the beginning and end, respectively, of said pulse modulated video signals corresponding to each said line interval for use in respectively controlling the phase and frequency of a demodulating signal when the recorded signals are reproduced.

9. The method according to claim 1; in which said substantially circular record tracks are successive turns of a continuous spiral track.

10. The method according to claim 1; in which said substantially circular record tracks are in the form of concentric circles having different diameters.

11. Apparatus for recording signals having line and field intervals, comprising a record disc, signal recording means arranged adjacent to said disc and receiving said signals, said signal recording means including pulse modulating means for pulse modulating a carrier with said received signals, pilot signal generating means for generating a pilot signal for use during subsequent playback of the recorded signals to demodulate the pulse modulated signals, means generating a beam of radiant energy modulated by said pulse modulating means and said pilot signal generating means and acting on said record disc for recording corresponding signals on said record disc, means for effecting the relatively slow translational movement of said record disc and signal recording means relative to each other so that said corresponding signals are recorded in substantially circular record tracks on the record disc, and means for effecting the relatively rapid repeated scanning by said beam of radiant energy in the radial direction of said record disc across the width of one of said record tracks so as to record at least one line interval of the pulse modulated signals and a pilot signal in at least preceding or following relation to said pulse modulated signals during each said scanning across said width of the record track.

12. Apparatus according to claim 11; in which said beam of radiant energy is an electron beam, and said means for effecting the relatively rapid repeated scanning by said beam includes means for deflecting said electron beam in said radial direction of the record disc in synchronism with said line intervals of the signals to be recorded.

13. Apparatus according to claim 11; in which said beam of radiant energy is a light beam having a cross-sectional dimension in said radial direction of the record disc which is at least equal to said width of the record track; and in which said means for effecting the relatively rapid repeated scanning by said beam includes an optical shutter disc extending into the path of said light beam and having a circularly arranged series of apertures spaced apart by substantially said width of the record track, and means for rotating said optical shutter disc in synchronism with said line intervals so that said apertures move through said light beam in succession substantially in said radial direction of the record disc.

14. Apparatus for reproducing signals having line and field intervals and which are recorded as pulse modulated signals on a record disc with successive line intervals of the recorded signals being recorded together with a pilot signal in at least preceding or following relation thereto in the radial direction of the record disc across the width of a substantially circular record track at respective locations along the circumference of said track; said apparatus comprising means for rotatably supporting the record disc, beam generating means for directiong a beam of radiant energy against the record disc for modulation of said beam by the signals recorded on the record disc, means for effecting the relatively slow translational movement of the record disc and said beam generating means relative to each other so that said beam generally traces said substantially circular track in which the signals are recorded, means for effecting the relatively rapid repeated scanning by said beam in the radial direction of the record disc across the width of said track being traced by the beam, radiationelectric transducer means receiving said beam after modulation by the signals recorded on the record disc for producing corresponding pulse modulated electrical and pilot output signals, means responsive to said pilot output signals for producing a carrier signal, and demodulator means for demodulating said pulse modulated electrical output signals with said carrier signal.

15. Apparatus according to claim 14; in which said beam of radiant energy is a light beam having a cross-sectional dimension in said radial direction of the record disc which is at least equal to said width of the track; and in which said means for effecting the relatively rapid repeated scanning by said beam includes a rotated optical shutter disc extending into the path of said light beam and having a plurality of apertures moving through said light beam in said radial direction of the record disc.

16. Apparatus according to claim 15; in which said apertures are equally spaced apart along a circle with distances therebetween substantially equal to said width of the record track.

17. Apparatus according to claim 15; in which said apertures are equally spaced apart by distances substantially equal to said width of the record track along a spiral on said optical shutter disc, and the light beam has a cross-sectional dimension, in the circumferential direction of the record track, which is at least equal to the circumferential extent of the record track accommodating recorded signals for at least one field interval so that, when said translational movement is halted, said electrical output signals correspond to a still reproduction of the recorded signals for a corresponding field interval.

18. Apparatus according to claim 14 wherein said means for producing a carrier signal comprises means for synchronizing the frequency and phase of a carrier oscillator with said pilot signals.

19. Apparatus according to claim 18 wherein said video signals are recorded as pulse-phase modulated signals and said pilot signals are recorded as a front pilot signal in advance of said recorded video signals and as a back pilot signal following said recorded video signals in each recorded line interval; and wherein said synchronizing means comprises extracting means for extracting said front and back pilot signals, respectively, from said electrical output signals; means for synchronizing the phase of said carrier oscillator with one of said pilot signals; and means for synchronizing the frequency of said carrier oscillator with the other of said pilot signals.

20. Apparatus according to claim 19 wherein said extracting means comprises first gate means for extracting said front pilot signal from said pulse modulated electrical output signals; second gate means for extracting said back pilot signal from said pulse modulated electrical output signals; and horizontal synchronizing signal generating means for deriving horizontal synchronizing signals from said pulse modulated electrical output signals, said horizontal synchronizing signals being supplied to said first and second gate means as gate control signals therefor, respectively.

21. Apparatus according to claim 20 wherein said carrier oscillator comprises a variable frequency oscillator and said means for synchronizing the phase thereof comprises means for supplying said front pilot signal extracted by said first gate means to said variable frequency oscillator for locking the phase of said variable frequency oscillator to the phase of said front pilot signal; and wherein said means for synchronizing the frequency of said carrier oscillator comprises phase comparator means having respective inputs coupled to said variable frequency oscillator and said second gate means for comparing the phases of said carrier signal and said extracted back pilot signal, and an output coupled to said variable frequency oscillator to control its oscillation frequency.

22. Apparatus according to claim 19 wherein said demodulator means comprises detecting means supplied with said pulse modulated electrical output signals and said synchronized carrier signal to produce a pulse-demodulated video signal; and a low pass filter coupled to said detecting means.

23. Apparatus according to claim 22 wherein said demodulator means further comprises horizontal synchronizing signal generating means for deriving horizontal synchronizing signals from said pulse modulated electrical output signals; and adder means coupled to said low pass filter and said horizontal synchronizing signal generating means for adding said horizontal synchronizing signal to said video signal.

24. Apparatus according to claim 18 wherein said recorded pulse modulated signals further include pulse width modulated audio signals; and wherein said apparatus further comprises pulse width demodulating means for demodulating said audio signals from said electrical output signals.

* * * * *